US009423314B2

United States Patent
Mei

(10) Patent No.: US 9,423,314 B2
(45) Date of Patent: Aug. 23, 2016

(54) DIFFERENTIAL PRESSURE SENSOR WITH MAGNETIC DISTANCE SENSOR

(71) Applicant: Giovanni Mei, Sale Marasino (IT)

(72) Inventor: Giovanni Mei, Sale Marasino (IT)

(73) Assignee: EUROWITCH S.R.L., Brescia (IT)

( * ) Notice: Subject to any disclaimer, the term of this patent is extended or adjusted under 35 U.S.C. 154(b) by 324 days.

(21) Appl. No.: 14/254,292

(22) Filed: Apr. 16, 2014

(65) Prior Publication Data

US 2014/0311248 A1    Oct. 23, 2014

(30) Foreign Application Priority Data

Apr. 23, 2013    (IT) .............................. MI2013A0668

(51) Int. Cl.
| | |
|---|---|
| *G01L 9/14* | (2006.01) |
| *G01L 9/00* | (2006.01) |
| *G01L 13/02* | (2006.01) |
| *G01L 19/14* | (2006.01) |

(52) U.S. Cl.
CPC .............. *G01L 9/14* (2013.01); *G01L 9/0089* (2013.01); *G01L 13/02* (2013.01); *G01L 19/147* (2013.01); *Y10T 29/49876* (2015.01)

(58) Field of Classification Search
CPC ....... G01L 9/14; G01L 9/0089; G01L 13/02; G01L 19/147; Y10T 29/49876
USPC .................. 73/722, 717, 716, 715, 700, 723
See application file for complete search history.

(56) References Cited

U.S. PATENT DOCUMENTS

| 5,419,191 | A | * | 5/1995 | Niehaus | .................... G01F 1/72 235/94 R |
| 5,693,926 | A | * | 12/1997 | Cassidy | ............... B01D 35/143 116/267 |
| 6,880,405 | B2 | * | 4/2005 | Mouhebaty | ........... G01L 9/0089 73/715 |
| 8,395,517 | B2 | * | 3/2013 | Abdoulin | ............. G01D 11/245 340/626 |
| 2004/0255684 | A1 | | 12/2004 | Mouhebaty | |
| 2013/0291645 | A1 | * | 11/2013 | Gammon | .................. G01L 7/16 73/716 |

FOREIGN PATENT DOCUMENTS

| FI | WO 9215002 A1 * | 9/1992 | .......... G01L 9/0089 |
| WO | WO 01/14841 | 3/2001 | |

OTHER PUBLICATIONS

IT MI20130668 Search Report mailed Feb. 10, 2014, 5 pages—Italian, 2 pages—English.

* cited by examiner

*Primary Examiner* — Lisa Caputo
*Assistant Examiner* — Nathaniel T Woodward
(74) *Attorney, Agent, or Firm* — Andrew F. Young, Esq.; Lackenbach Siegel, LLP

(57) ABSTRACT

A differential pressure sensor includes a containment body defining a first and a second cavity separated by a separation wall; a piston housed slidably in the first cavity and comprising a magnet; a magnetic sensor housed in the second cavity near the separation wall for sensing the axial distance of the magnet from the separation wall; a positioning system housed in the second cavity and having one portion of a first axial end thereof which supports the magnetic sensor and is elastically yieldable in an axial direction and away from the separation wall, the positioning system being structured so that when it is moved towards the separation wall, the magnetic sensor contacts the latter before the positioning system reaches an axial stroke end, said stroke end being reached thanks to the above-mentioned elastic yielding.

13 Claims, 4 Drawing Sheets

Fig.4
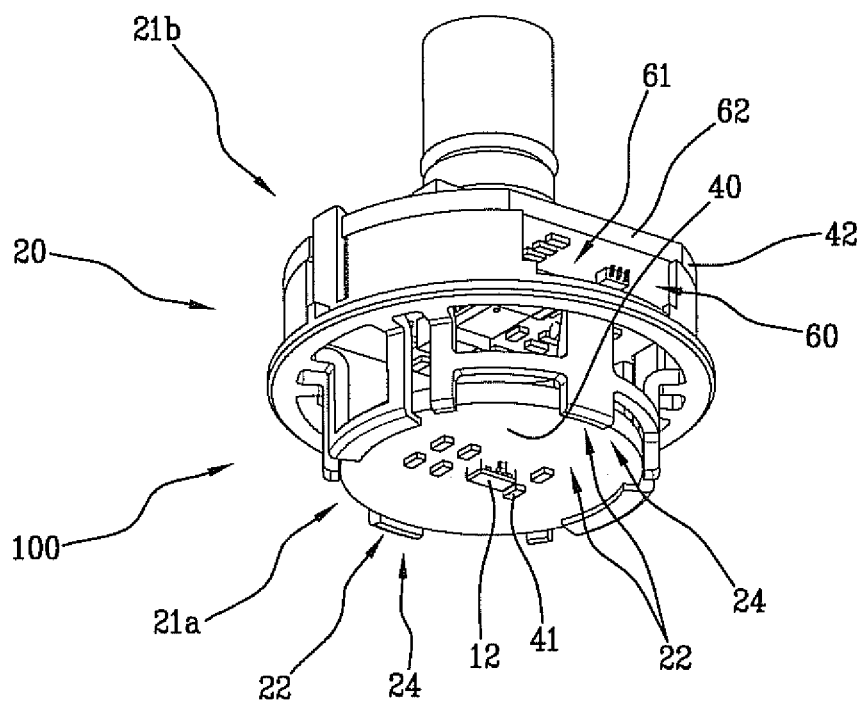
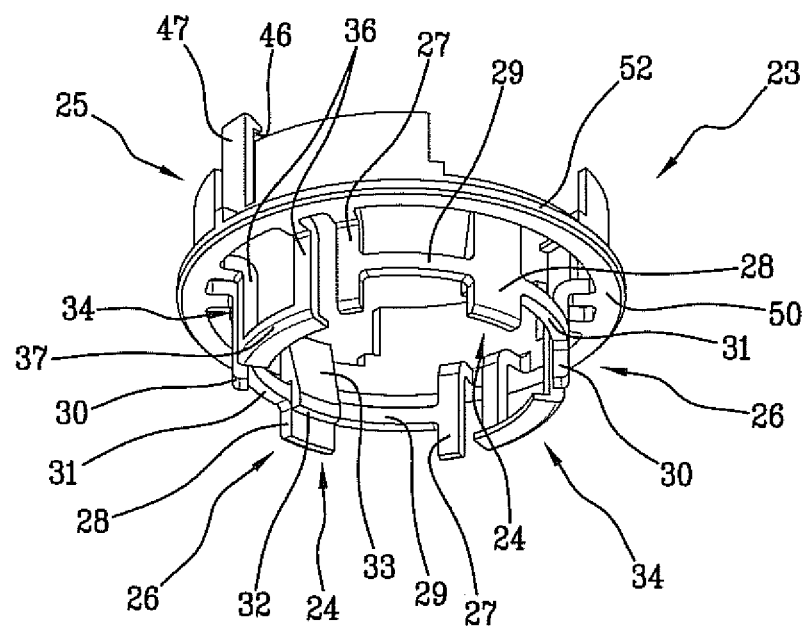
Fig.5

DIFFERENTIAL PRESSURE SENSOR WITH MAGNETIC DISTANCE SENSOR

CROSS REFERENCE TO RELATED APPLICATIONS

This application relates to and claims priority from Italian App. Ser. No. IT MI2013A000668 filed Apr. 23, 2013, the entire contents of which are incorporated herein fully by reference.

FIGURE SELECTED FOR PUBLICATION

FIG. 1

BACKGROUND OF THE INVENTION

1. Field of the Invention

The present invention relates to a differential pressure sensor. More particularly, the present invention provides a differential pressure sensor with an improved sensitivity and structure system.

2. Description of the Related Art

There are known differential pressure sensors, that is, devices capable of sensing the difference in pressure between two points of a circuit containing a fluid (liquid, gas, vapor, etc) under pressure and to provide an output signal, typically electric, representing this difference. Typically, such devices are used to sense the pressure difference between two points respectively downstream and upstream of an element in a circuit under pressure, such as an oil filter.

Differential pressure transmitters of (hereinafter also only 'transmitters') are differential pressure sensors capable of sensing a plurality, typically a continuum, of values of the aforesaid pressure difference within a working interval. In this respect they differ from differential pressure sensors of the ON/OFF type (commonly called 'electrical or electromechanical differential' sensors), capable only of sensing whether a threshold pressure difference has been reached.

One class of transmitters, characterized by a complex structure and high industrial costs, separately senses the value of the two pressures, which are subsequently compared in order to provide the output signal representing their difference.

Another class of transmitters directly senses the pressure difference, the output signal being a function of that value, and typically proportional thereto.

The latter type of transmitter typically comprises a piston fluctuating inside a cylinder, the piston dividing the cylinder into two chambers in which the fluid has substantially the same pressure, respectively, as the aforesaid two points in the circuit being monitored. The piston is subject to an axial force, the modulus of whose resultant is a function of the pressure difference, and the position of the piston inside the cylinder depends on the axial force and on an elastic axial force exerted by a spring interposed between the piston and the cylinder.

The piston comprises, at an end axial thereof, a magnet which is facing a bottom wall of the cylinder. In proximity to the face opposite the bottom wall (typically in contact with the opposite face) there is a magnetic sensor (for example a Hall effect sensor) which enables a continuous sensing of the distance of the magnet from the bottom wall. A suitable electronic circuit translates the information produced by the magnetic sensor into a signal representing the pressure difference.

According to the Applicant the differential pressure sensors of the prior art are not free of drawbacks. According to the Applicant, for example, there is a problem related to the positioning of the magnetic sensor in proximity to the aforesaid bottom wall. Such positioning must in fact be sufficiently precise, axially and/or radially, and stable over time while simultaneously ensuring that the magnetic sensor is not subjected to excessive mechanical stresses. This task is made even more difficult by the fact that if the magnetic sensor is mounted on an electronic card, the latter will typically be produced with geometric tolerances that conflict with the desired tolerances for the positioning of the magnetic sensor.

Accordingly, there is a need for an improved differential pressure sensor that addresses at least one of the concerns noted above.

ASPECTS AND SUMMARY OF THE INVENTION

In response, it is now recognized that one aspect of the present invention is to provide a differential pressure sensor which can resolve the aforesaid problem of axial and/or radial positioning of the magnetic sensor, preferably in such a way that the positioning, in the phase of assembly of the pressure sensor, is simple and/or rapid and/or reliable.

This aspect, and any others that will emerge from the present application as a whole, are achieved by a differential pressure sensor according to the following different embodiments, as well as according to the appended claims, which all represent further embodiments of the invention, also variously combined with the aforesaid embodiments.

The invention relates to a differential pressure sensor having an axis of extension and comprising:
  a containment body defining a first cavity (at a first end) and a second cavity (at a second end which is axially opposite the first end), the containment body comprising a separation wall between the first and the second cavity;
  a piston housed slidably in the first cavity in such a way as to separate the latter into a first and a second chamber, each chamber being in fluid communication with the outside of the containment body, the piston comprising a magnet (e.g. permanent) mounted on a first axial end of the piston proximal to the separation wall;
  a magnetic sensor housed in the second cavity near the separation wall, said magnetic sensor being designed to sense the axial distance of the magnet from said separation wall and to generate a signal (typically electrical) representing that distance.

The term 'axial' is used with reference to said axis of extension of the pressure sensor (for example, according to context, it can mean along a direction parallel to said axis) and the term 'perpendicular' is used with reference to a generic plane perpendicular to said axis of extension.

Preferably, the differential pressure sensor comprises a positioning system housed in the second cavity and having a first axial end proximal to the separation wall, wherein at least one portion of said first axial end supports the magnetic sensor and is elastically yieldable in an axial direction and away from the separation wall, and wherein the positioning system is structured in such a way that when the positioning system is moved (substantially axially) towards the separation wall, the magnetic sensor contacts the latter before the positioning system arrives at an axial stroke end thereof inside the second cavity, said stroke end being reached thanks to the above-mentioned elastic yielding.

According to the Applicant, the aforesaid features, in particular the fact that at least one portion of the first axial end supports the magnetic sensor and is elastically yieldable in an axial direction and away from the separation wall and that the positioning system is structured in such a way that when the positioning system is moved (substantially axially) towards the separation wall, the magnetic sensor contacts the latter before the positioning system arrives at an axial stroke end thereof inside the second cavity, said stroke end being reached thanks to the above-mentioned elastic yielding, enables the magnetic sensor to be positioned so as to assure that it is in contact with the separation wall and with a slight axial push against the latter, all in a simple and/or rapid and/or reliable manner without the magnetic sensor being subjected to excessive mechanical stresses. In fact, when the positioning system is moved (substantially axially) towards the separation wall, and the magnetic sensor contacts the latter, said portion of the first axial end supporting the magnetic sensor begins yielding elastically in an axial direction and away from the separation wall and continues to yield elastically during the rest of the stroke of the positioning system until reaching the stroke end. Upon reaching the axial stroke end, the portion of the first axial end supporting the magnetic, elastically yieldable sensor remains (at least) elastically deformed in the axial direction, away from the separation wall, thereby maintaining the sensor lightly pushed (due to the axial elastic return force) against the separation wall. It shall be observed that the expression 'contact the separation wall' is to be understood in a general sense, and comprises both the case of direct contact with the separation wall and indirect contact, since, for example, one or more elements (e.g. an insulating sheet) may be interposed. In this regard, it shall also be observed that said further elements can be considered as comprised in the separation wall, so that the aforesaid expression again refers to the case of direct contact.

Preferably, the magnetic sensor is based on the Hall effect.

Preferably, the axial length of the stroke of the positioning system between the point in which the magnetic sensor contacts the separation wall and the axial stroke end (this length corresponding to the length of the axial elastic yielding of the positioning system between the configuration in the absence of stresses and the final end-of-stroke assembly configuration) is greater than, or equal to, 0.1 mm, more preferably greater than, or equal to, 0.3 mm, and/or less than, or equal to, 1.5 mm, more preferably less than, or equal to, 1 mm. Advantageously, in such a manner the elastic yielding is capable of absorbing the typical manufacturing geometric tolerances of the positioning system and/or of the containment body and of thereby ensuring the correct axial and/or radial positioning of the magnetic sensor.

Preferably, the positioning system comprises a positioning element having a portion at the first axial end which is elastically yieldable in an axial direction and away from the separation wall.

Preferably, the differential pressure sensor and/or one or more of the elements thereof (e.g. the first and/or the second cavity, the piston, the containment body and/or the positioning element) has/have a substantially annular configuration with an axis coinciding with said axis of extension (thus being defined a radial direction having a perpendicular direction), more preferably it has/they have (substantially) a cylindrical symmetry with an axis coinciding with the axis of extension. In this manner, positioning errors are reduced.

Preferably, the positioning element comprises a main body, more preferably with a substantially annular configuration with an axis coinciding with said axis of extension. Preferably, the main body of the positioning element is substantially rigid.

Preferably, said elastically yieldable portion of the positioning element is elastically connected to the main body and facing towards the separation wall.

Preferably, said portion of the positioning element is elastically yieldable in an axial direction and away from the separation wall at two mutually opposite points relative to the axis. This serves to assure a correct elastic yielding, since the elastic deformation is symmetrical relative to the axis. The magnetic sensor (and the first supporting element) is thus not subject to perpendicular/radial movements and/or rotations, thus ensuring the correct perpendicular/radial positioning of the sensor.

Preferably, the positioning element comprises a first pair of protrusions protruding axially from the main body towards the separation wall, said first pair comprising said elastically yieldable portion of the positioning element. Preferably, the protrusions of the first pair are mutually opposite relative to the axis of extension and comprise respectively the aforesaid two points.

Preferably, each of the protrusions of the first pair has at least one first upright extending (substantially), in the absence of deformation forces, in an axial direction and connected with the main body and a mobile element connected to (the free end of) said first upright, in such a way that the two mobile elements form said portion of the positioning element that is elastically yieldable axially and away from the separation wall. Preferably, a first arm connects the mobile element to the first upright (e.g. to the free end of the first upright), the first arm extending substantially transversely (e.g. perpendicularly) to the axis of extension, more preferably extending substantially along an arc of a circle (having its centre on the axis). Preferably, the mobile element is connected to the main body of the positioning element solely by interposing other structural elements (e.g. upright, arm). Preferably, each of said protrusions of the first pair has a second upright extending (in the absence of deformation forces) parallel to the first upright and directly connected with the main body specularly to the first upright relative to the mobile element, said mobile element being connected to said second upright through a second arm, the second arm extending substantially transversely (e.g. perpendicularly) to the axis of extension, more preferably extending substantially along an arc of a circle (having its centre on the axis, for example an arc of said circle), even more preferably specularly to the first arm relative to the mobile element. In this manner, advantageously, the mobile elements move along a (substantially) axial trajectory, thus favoring the correct positioning (e.g. perpendicular) of the magnetic sensor.

Advantageously, said elastic axial yielding of the portion of the positioning element is achieved thanks to the elastic deformation (bending and/or torsion) of the first (and second) upright and of the first (and second) arm, and thanks to the fact that the mobile element can fluctuate axially (and radially) relative to the main body of the positioning element.

Preferably, said elastically yieldable portion of the positioning element (e.g. each protrusion of the first pair, preferably each mobile element) has a first shoulder which forms a first supporting surface facing towards the separation wall. Preferably, said elastically yieldable portion of the positioning element (e.g. each mobile element) is elastically yieldable at said shoulder also in a perpendicular (e.g. radial) direction away from the axis of extension. In this manner, the first supporting element can be placed on the first supporting surface (see further below) upon insertion by axial sliding of the former. Preferably, said elastically yieldable portion of the positioning element (e.g. each mobile element) has an inclined surface immediately upstream of the first shoulder so as to favor such insertion by sliding of the first supporting element.

Preferably, the positioning element comprises a second pair of protrusions protruding axially from the main body towards the separation wall. Preferably, said protrusions of the second pair are mutually opposite relative to the axis of extension. Preferably, said protrusions of the second pair are (regularly) interspersed with the protrusions of the first pair.

Preferably, each of the protrusions of the second pair has, preferably at the free end, a second shoulder which forms a second supporting surface facing towards the main body of the positioning element (or facing the first surface).

Typically, each of the protrusions of the second pair is axially rigid and connected to the main body.

Preferably, each of the protrusions of the second pair has a respective first and second upright, which extend substantially axially (and are substantially axially rigid) and are connected with the main body, and a respective arm that connects the two uprights, the respective arm extending substantially transversely (e.g. perpendicularly) to the axis of extension, more preferably extending substantially along an arc of a circle (having its centre on the axis, for example along an arc of said circle). Preferably, said second shoulder of the protrusions of the second pair is fashioned on said respective arm on the side facing towards the axis.

Preferably, the positioning system comprises at least one first supporting element, on a first face of which the magnetic sensor is rigidly mounted, and moreover, typically, a temperature sensor.

Preferably, the first supporting element is part of said portion of the first axial end that is elastically yieldable in an axial direction.

Preferably, said first supporting element is snap fitted (in the absence of elastic deformations of the positioning system, e.g. prior to assembly of the positioning system in the differential pressure sensor) onto the positioning element at the first axial end in such a way that the first face thereof is facing towards the separation wall, more preferably being wedged between said first and second supporting surface, which are mutually facing. It shall be observed that upon the completion of assembly, the first supporting element is typically detached from the second supporting surface and slightly pushed against the first supporting surface.

Preferably, the differential pressure sensor comprises an electronic processing and control system configured to acquire and process the signal generated by the magnetic sensor (and optionally also a respective signal generated by the temperature sensor) and to generate, as a function of said signal generated by the magnetic sensor (and optionally of said signal generated by the temperature sensor), an output signal representing a pressure difference between the first and the second cavity.

Preferably, said first supporting element is an electronic card comprising printed circuits and/or electronic components forming part of the electronic system.

Preferably, the positioning system comprises a second supporting element that is distinct and separate axially from the first supporting element.

Preferably, said first and/or second supporting element has/have a substantially disk-shaped configuration.

Preferably, said second supporting element is an electronic card comprising printed circuits and/or electronic components forming part of the electronic system, including, for example, a electronic processor and a connector for the electrical interface with the differential pressure sensor. Preferably, a flexible electrical connection electrically connects the circuits and/or the electronic components of the first and second supporting element.

According to the Applicant, the distribution of the electronic system over two axially distributed supporting elements is particularly rational and effective, as it enables a reduction in the overall dimensions of the pressure sensor and, moreover, a simple and/or rapid and/or reliable assembly thereof.

Preferably, said second supporting element is snap fitted onto the positioning element at a second axial end of the positioning system, more preferably being wedged between a third and a fourth supporting surface of the positioning element, which are mutually facing. Preferably, said third supporting surface extends in a plane perpendicular to the axis and belongs to the terminal surface of the main body of the positioning element at the second axial end. Preferably, said fourth surface is defined by a third shoulder fashioned in a third pair of protrusions protruding axially from the main body away from the separation wall. Preferably, said protrusions of the third pair are mutually opposite relative to the axis of extension. Preferably, said protrusions of the third pair are elastically yieldable in a perpendicular direction away from the axis of extension, and more preferably each comprises an inclined surface for the axial insertion of the second supporting element.

Preferably, the positioning element comprises a first reference surface (e.g. extending perimeterally/circumferentially) facing towards the separation wall (e.g. lying in a plane perpendicular to the axis) and in contact, when the positioning system is at the stroke end, with a respective stop element formed in the second cavity of the containment body.

Preferably, the positioning element comprises a second reference surface extending perimetrally and axially (e.g. perpendicular to the first surface) and facing towards (e.g. in contact, taking into account the necessary play) an inner surface of the second cavity. In this manner, the correct axial and perpendicular positioning of the magnetic sensor is assured with only two reference surfaces.

Preferably, the containment body comprises a respective main body (comprising said separation wall) and a shell coupled with the main body in such a way as to close off the second cavity.

Preferably, the axial end perimetral edge of the shell facing towards the separation wall is in contact with a third reference surface of the positioning element, facing in the opposite direction relative to the first reference surface. In this manner, the correct positioning of the shell relative to the positioning system is assured. Preferably, the positioning element (e.g. the main body thereof) has a perimetral flange (e.g. circumferential) protruding perpendicularly (e.g. radially) away from the axis and on which one or more of the aforesaid reference surfaces are fashioned.

Preferably, a resin, e.g. an electrically insulating one, at least partially fills the space inside the shell left free by the positioning system, more preferably, up to a level such that at least said elastically yieldable portion of the first axial end of the positioning system (e.g. at least the first pair of protrusions and the first supporting element) is left free by the resin.

Preferably, the positioning system has an internal compartment and at least one opening passing through perpendicularly (more preferably, two openings passing through perpendicularly and mutually opposite relative to the axis) so as to render the internal compartment accessible from the outside. Preferably, the second supporting element has a channel at each pass-through opening(s). In this manner it is possible to inject the resin into the shell as specified below.

Preferably, the containment body comprises an adjustment grub screw mechanically coupled to said main body in such a way as to close off said first cavity at the axial end opposite the separation wall. Preferably, a spring is interposed between the piston and the adjustment grub screw.

Preferably, the main body of the containment body and/or the shell and/or the piston and/or the adjustment grub screw and/or the spring are/is made of a metal such as steel (e.g. stainless steel) or, more preferably, brass (or alloys thereof).

Preferably, the positioning element and/or the shell and/or said first and/or said second supporting element are/is made of plastic material.

In a further aspect, the invention relates to a method for assembling the differential pressure sensor of the present invention, comprising (axially) inserting the first supporting element with a snap fit into the positioning element (e.g. until it is interposed between the first and the second supporting surface), (axially) inserting the second supporting element with a snap fit into the positioning element (e.g. until it is interposed between the third and the fourth supporting surface), inserting the positioning system thus formed into the shell and, finally, inserting the assembly formed by the positioning system and the shell into the second cavity up to the stroke end.

Optionally, before the aforesaid assembly is inserted, it is positioned with the shell disposed below the positioning element and electrically insulating resin is injected into the internal compartment of the positioning system and, via the pass-through opening(s) and the bevel(s) of the second supporting element, into an internal compartment of the shell left free by the positioning system, up to the aforesaid level.

Additional features and advantages will be more apparent from the detailed description of some example, but non-exclusive embodiments, of a differential pressure sensor in accordance with the present invention. The description will be set forth here below with reference to the appended drawings, provided solely by way of non-limiting illustration in which like reference numerals designate the same elements.

BRIEF DESCRIPTION OF THE DRAWINGS

FIG. 4 shows a partial schematic perspective view of the positioning system of the sensor in FIG. 1;

FIG. 5 shows a perspective view of the positioning element of the sensor in FIG. 1.

DETAILED DESCRIPTION OF THE PREFERRED EMBODIMENTS

Figure 1:
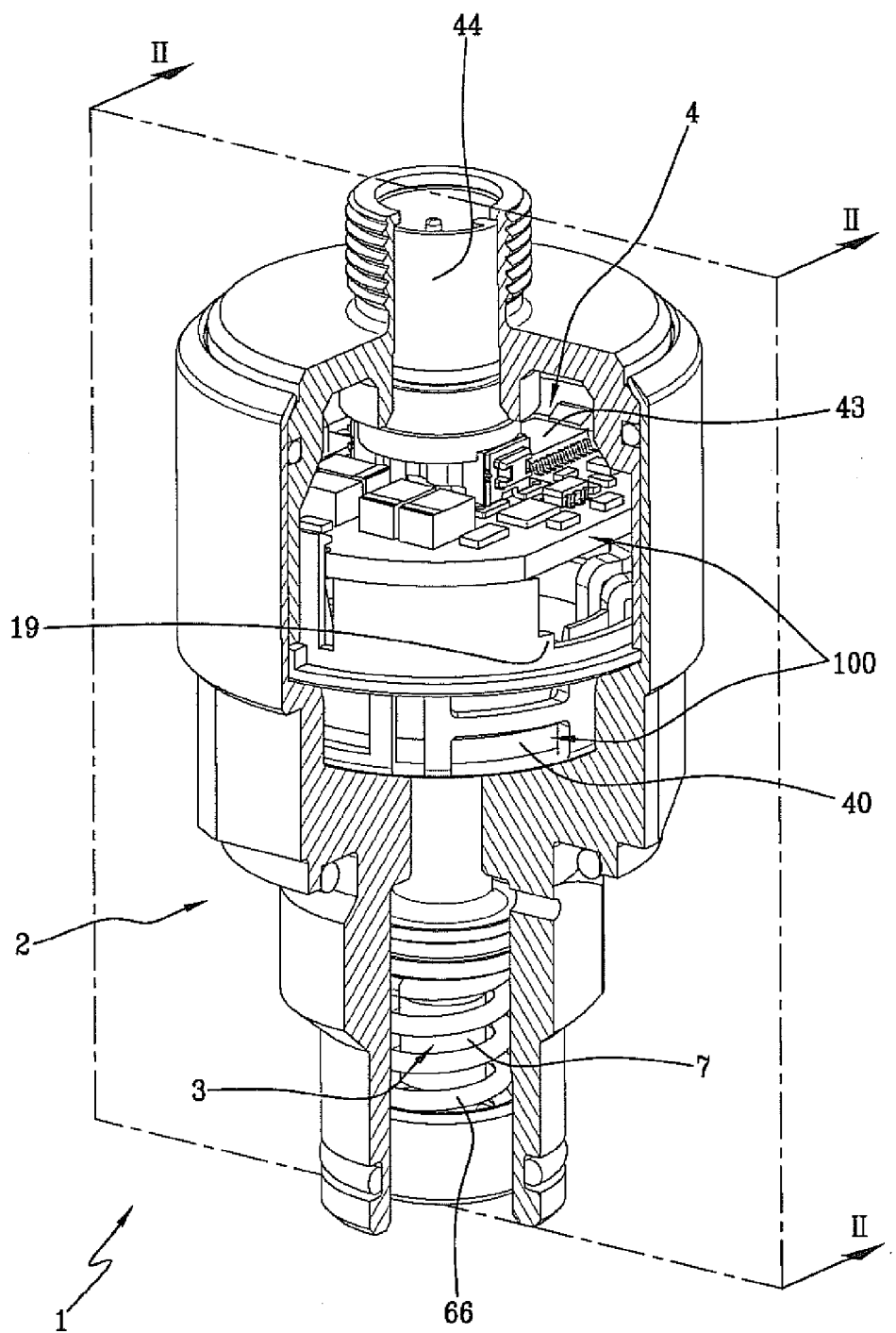
FIG. 1 shows a partial, schematic, partially cut-away perspective view of a differential pressure sensor according to the present invention, in the configuration in which the positioning system is at the stroke end.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

With reference to the appended figures, the reference number 1 indicates a differential pressure sensor according to the present invention.

Figure 2:
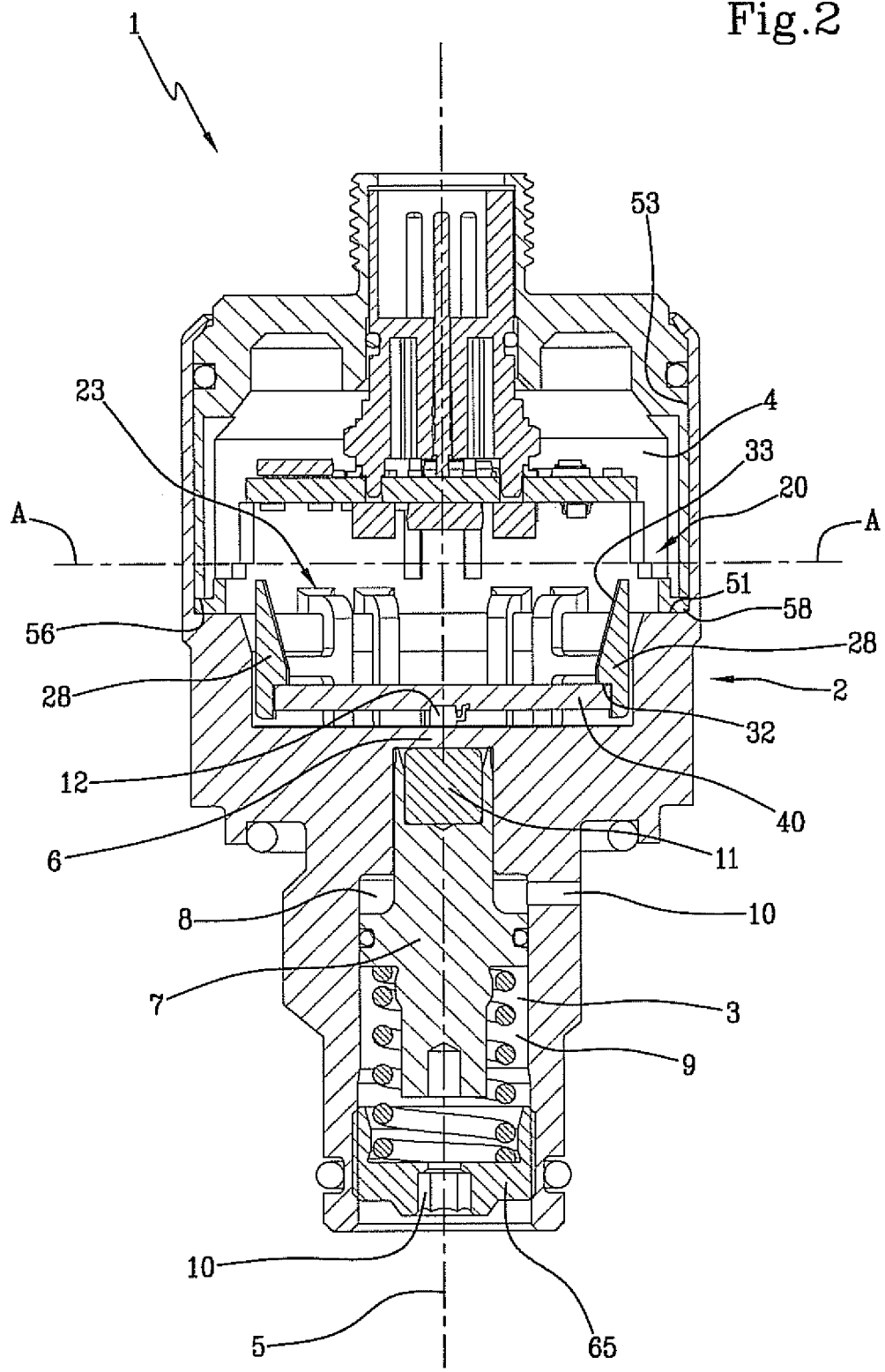
FIG. 2 shows a partial, schematic sectional view of the differential pressure sensor in FIG. 1 along the section plane II-II.

The differential pressure sensor comprises a containment body 2 (typically rigid) defining a first cavity 3 at a first end and a second cavity 4 at a second end opposite the first end along an axis of extension 5 of the pressure sensor, the containment body comprising a separation wall 6 between the first and the second cavity (extending perpendicularly to the axis 5). In the present application, every reference to the axis of extension is intended to mean the axis passing in a perpendicularly central (or median) position of the sensor, as shown in FIG. 2.

The sensor 1 typically comprises a piston 7 housed slidably in the first cavity in such a way as to separate the latter (e.g. by means of an o-ring, a seal and/or with a slight leakage of fluid) into a first 8 and a second chamber 9, each chamber being in fluid communication (for example by means of the hydraulic conduits 10) with the outside of the containment body (so that the pressure of the fluid in the chambers 8 and 9 is equal to the pressure of the fluid in the two points of the circuit being monitored).

The piston comprises a permanent magnet 11 mounted on a first axial end of the piston which is proximal to the separation wall.

The sensor 1 further comprises a magnetic sensor 12 housed in the second cavity 4, near the separation wall 6, the magnetic sensor being designed to sense the axial distance of the magnet 11 from the separation wall and to generate a signal representing tale distance.

Preferably, the first and the second cavity, the piston and the containment body substantially have (with the exception of a few details such as appropriate bevels, keying surfaces, etc, as shown in the figure) a cylindrical symmetry around the axis of extension.

Preferably, the differential pressure sensor comprises a positioning system 20 housed in the second cavity and having a first axial end 21a proximal to the separation wall, wherein at least one portion 22 of said first axial end 21a supports the magnetic sensor and is elastically yieldable in an axial direction and away from the separation wall, and wherein the positioning system is structured in such a way that when the positioning system is moved substantially axially toward the separation wall, the magnetic sensor contacts the latter before the positioning system arrives at an axial end stroke inside the second cavity, said end stroke being reached thanks to the aforesaid elastic yielding.

It shall be observed that the expression 'contact the separation wall' also includes the case, shown in the figure, of indirect contact of the magnetic sensor with the separation wall, since, for example, one or more elements may be interposed (e.g. an electrically insulating sheet 13, made, for example, of Mylar in a thickness of 0.1 mm, which can also be considered as comprised within the separation wall).

Preferably, the positioning system 20 comprises a positioning element 23 having a portion 24 at the first axial end 21a, which is elastically yieldable in an axial direction and away from the separation wall.

Preferably, the positioning element 23 has a substantially annular configuration, and an axis coinciding with the axis of extension 5.

Preferably, the positioning element comprises a main body 25 with a substantially annular configuration and an axis coinciding with the axis of extension.

Preferably, the portion 24 of the positioning element is elastically yieldable in an axial direction and away from the separation wall in two mutually opposite points relative to the axis 5 (in the example in the figure, the two points are diametrically opposed to each other).

Preferably, the positioning element 23 comprises a first pair of protrusions 26 protruding axially from the main body towards the separation wall and diametrically opposed, the elastically yieldable portion 24 of the positioning element forming part of such protrusions 26.

Preferably, each protrusion 26 has a first upright 27, which extends substantially axially (and is substantially rigid in the axial direction) and is connected with the main body (e.g. by means of a section bent into an elbow), and a mobile element 28 connected to the first upright in such a way that the two mobile elements 28 form the portion 24 of the elastically yieldable positioning element. Preferably, a first arm 29 connects the mobile element to the first upright, the first arm extending substantially in a plane perpendicular to the axis and substantially along an arc of a circle having its centre on the axis. Preferably, the mobile element 28 is not directly connected to the main body. Preferably, each of the protrusions 26 has a second upright 30 (substantially axially rigid) extending parallel to the first upright 27 and connected with the main body specularly to the first upright relative to the mobile element, the mobile element 28 being also connected to the second upright by means of a second arm 31, the second arm extending substantially perpendicularly to the axis of extension and along an arc of the same circle of the first arm. The axial elastic yielding of the mobile elements 28 is achieved, by way of example, thanks to the elastic deformation of the first (and optionally second) upright 27, 30 (e.g. by bending at the point of the elbow and/or rotation about its longitudinal axis) and of the first (and optionally second) arm 29, 31 (e.g. by bending and/or torsion on its longitudinal axis).

Figure 3:
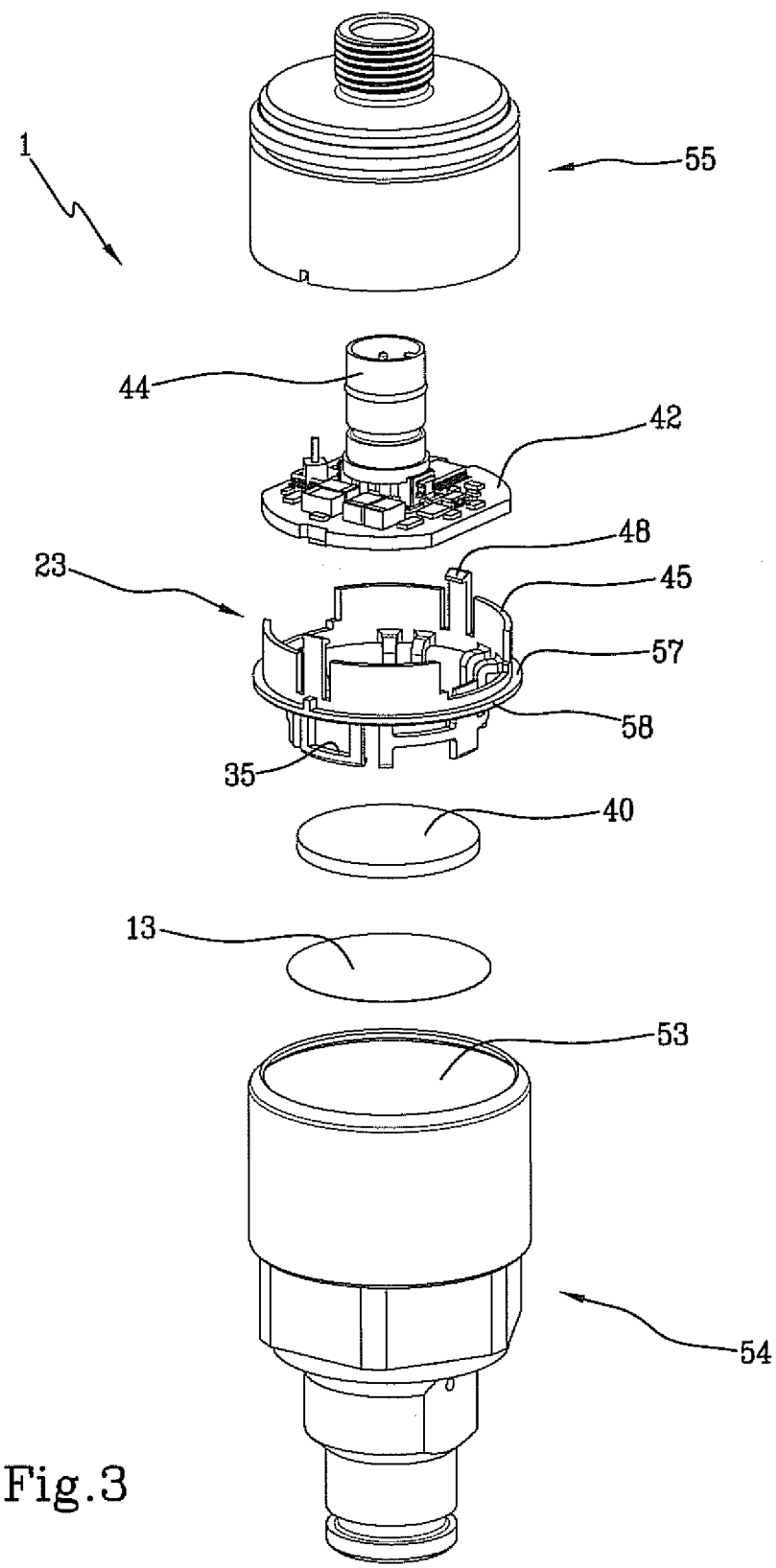
FIG. 3 shows a partial and partially exploded perspective view of the differential pressure sensor in FIG. 1.

It shall be observed that FIGS. 3-5 show the positioning system and/or the positioning element in a non-deformed configuration (absence of deformation forces). In FIGS. 1 and 2 the positioning system is at the stroke end; however, the elastic deformations to which the positioning element is subjected have not been illustrated in detail, the figure being limited to illustrating the corresponding position assumed by the mobile elements 28 and the first supporting element 40.

Preferably, each mobile element 28 has a first shoulder that forms a first supporting surface 32 facing towards the separation wall 6. Preferably, the elastically yieldable portion 24 of the positioning element is elastically yieldable, at the shoulder, also in a radial direction away from the axis of extension (thanks to the radial flexibility of the first and/or second arm and of the first and/or second upright). Preferably, an inclined surface 33 is present immediately upstream of the first shoulder so as to favor the insertion by axial sliding of the first supporting element 40 until it is placed on the first supporting surface 32.

Preferably, the positioning element comprises a second pair of protrusions 34 protruding axially from the main body towards the separation wall and diametrically opposed. Preferably, the protrusions 34 of the second pair are regularly interspersed with the protrusions 26 of the first pair.

Preferably, each protrusion 34 has a second shoulder that forms a second supporting surface 35 facing towards the main body.

Preferably, each protrusion 34 has a respective first and second upright 36, which extend substantially axially and are connected with the main body, and a respective arm 37, which connects the two uprights, the respective arm extending perpendicularly and along an arc of the same circle of the first and/or second arm. Preferably, the second shoulder is fashioned on the respective arm 37.

Preferably, the positioning system 20 comprises at least one first supporting element 40 on a first face of which there is rigidly mounted the magnetic sensor and, more preferably, a temperature sensor 41.

Preferably, the first supporting element is snap fitted (in the absence of elastic deformations of the positioning system) onto the positioning element at the first axial end 21a in such a way that the first face thereof is facing towards the separation wall, being more preferably wedged between said first 32 and second supporting surface 35, which are mutually facing.

Preferably, the positioning system comprises a second supporting element 42 that is distinct and separate axially from the first supporting element.

Preferably, the differential pressure sensor comprises the aforesaid electronic processing and control system 100.

Preferably, the first and/or second supporting element is/are an electronic card comprising printed circuits and/or electronic components (shown only schematically in the figure) belonging to the electronic system 100. For example, the second supporting element comprises at least one electronic processor 43 and a connector 44 for the electrical interface of the differential pressure sensor. Preferably, a flexible electrical connection (not shown), e.g. a flexible four-line tape, electrically connects the circuits and/or electronic components of the first and second supporting element.

Preferably, the second supporting element 42 is snap fitted onto the positioning element 23 at a second axial end 21b of the positioning system, being more preferably wedged between a third 45 and a fourth 46 supporting surface of the positioning element, which are mutually facing. Preferably, the third supporting surface 45 extends in a plane perpendicular to the axis and belongs to the terminal surface of the main body 25 of the positioning element 23 at the second axial end 21b (see FIG. 3). Preferably, said fourth surface 46 is defined by a third shoulder fashioned in a third pair of protrusions (or couplings) 47 protruding axially from the main body away from the separation wall. Preferably, the protrusions 47 are mutually diametrically opposed and are elastically yielding in a radial direction away from the axis of extension, each comprising an inclined surface 48 for the axial insertion of the second supporting element 42.

Preferably, the main body 25 of the positioning element 23 comprises a first reference surface 50 facing towards separation wall (e.g. lying in a plane perpendicular to the axis) and in contact, when the positioning system is at the stroke end, with a respective stop element 51 (e.g. extending circumferentially in a perpendicular plane) fashioned on the containment body in the second cavity.

Preferably, the main body 25 of the positioning element comprises a second reference surface 52 extending perimeterally and axially and facing towards an inner surface 53 of the second cavity.

Preferably, the containment body 2 comprises a respective main body 54, more preferably in one piece, comprising the separation wall 6, and a shell 55 coupled (e.g. by cold plastic perimetral deformation of the axial end perimetral edge of the main body, as shown in FIGS. 1-3) to the main body 54 in such a way as to close off the second cavity.

Preferably, the axial end perimetral edge 56 of the shell facing towards the separation wall is in contact with a third reference surface 57 of the main body 25 of the positioning element. Preferably, the main body 25 of the positioning element has a circumferential flange 58 protruding radially away from the axis and on which the three reference surfaces are fashioned.

Preferably, a resin (not shown), e.g. electrically insulating, at least partially fills the space inside the shell left free by the positioning system, more preferably, up to a level (shown by way of example as level A-A in FIG. 2) such that at least the elastically yieldable portion 22 of the first axial end 21a of the positioning system (e.g. at least the first pair of protrusions 26 and the first supporting element 40) is left free by the resin. Optionally, a suitable level indicator 19 is fashioned on the positioning element in order to view the correct resin level.

Preferably, the positioning system 20 has an internal compartment 61 and two diametrically opposed pass-through openings 60, in order to make the internal compartment accessible from the outside. Preferably, the second supporting element has a channel 62 at the pass-through openings.

Preferably, the containment body comprises an adjustment grub screw 65 coupled (e.g. by means of a thread) to the main body 54 in such a way as to close off the first cavity. Preferably, a spring 66 is interposed between the piston and the adjustment grub screw.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A differential pressure sensor, having an axis of extension, comprising:
   a containment body defining a first and a second cavity, the containment body comprising a separation wall between the first and the second cavity;
   a piston housed slidably in the first cavity in such a way as to separate the latter into a first and a second chamber, each chamber being in fluid communication with the outside of the containment body, the piston comprising a magnet mounted on a first axial end of the piston proximal to the separation wall;
   a magnetic sensor housed in the second cavity near the separation wall, the magnetic sensor being designed to sense the axial distance of the magnet from the separation wall and to generate a signal representing said distance;
   wherein the differential pressure sensor further comprises a positioning system housed in the second cavity and having a first axial end proximal to the separation wall, wherein at least one portion of the first axial end supports the magnetic sensor and is elastically yieldable in an axial direction and away from the separation wall and wherein the positioning system is structured in such a way that when the positioning system is moved towards the separation wall the magnetic sensor contacts the latter before the positioning system reaches a relative axial stroke end inside the second cavity, the stroke end being reached thanks to the above-mentioned elastic yielding.

2. The sensor, according to claim 1, wherein:
   the axial length of the stroke of the positioning system between the point in which the magnetic sensor contacts the separation wall and the relative axial stroke end is greater than, or equal to, 0.1 mm.

3. The sensor, according to claim 2, wherein:
   the positioning system further comprises:
   a positioning element having a portion at the first axial end which is elastically yieldable in an axial direction and away from the separation wall.

4. The sensor, according to claim 1, wherein:
   the positioning system comprises a positioning element having a portion at the first axial end which is elastically yieldable in an axial direction and away from the separation wall.

5. The sensor, according to claim 4, wherein:
   the portion of the positioning element is elastically yieldable in an axial direction and away from the separation wall at two points mutually opposite with respect to the axis of extension.

6. The sensor, according to claim 4, wherein:
   the positioning element comprises a main body, wherein the portion of the positioning element which is elastically yieldable is elastically connected to the main body and facing the separation wall and wherein the positioning element comprises a first pair of protrusions protruding axially from the main body towards the separation wall; and
   the first pair comprising:
   said portion of the positioning element which is elastically yieldable, the protrusions of the first pair being mutually opposite with respect to the axis of extension.

7. The sensor, according to claim 6, wherein:
   each of the protrusions of the first pair have at least one first upright extending, in the absence of deformation forces, substantially in an axial direction and connected with the main body, a mobile element connected to the first upright and a first arm connecting the mobile element to the first upright;
   the first arm extending substantially transversely to the axis of extension, wherein each of the protrusions of the first pair has a second upright with an extension parallel to the first upright and connected with the main body specularly to the first upright relative to the mobile element, the mobile element being connected to the second upright through a second arm with an extension substantially transversal to the axis of extension, in such a way that the two mobile elements form the portion of the positioning element which is elastically yieldable in an axial direction and away from the separation wall;

said elastic yielding in an axial direction of the portion of the positioning element being achieved upon the elastic deformability of the first and second upright and of the first and second arm and upon the arrangement that the mobile element is connected to the main body of the positioning element only by the interposing of other structural elements.

8. The sensor, according to claim 4, wherein:

the positioning system comprises at least one first supporting element on a first face of which is rigidly mounted the magnetic sensor, the first supporting element forming part of the portion of the first axial end elastically yieldable in an axial direction, wherein the portion of the positioning element elastically yieldable has a first shoulder which forms a first supporting surface facing towards the separation wall and an inclined surface upstream of the first shoulder to favor an insertion by axial sliding of the first supporting element, wherein the positioning element has a second shoulder which forms a second supporting surface facing the first supporting surface, and wherein the first supporting element, in the absence of elastic deformations of the positioning system, is snap fitted between the first and second supporting surface on the positioning element at the first axial end in such a way that the relative first face faces towards the separation wall.

9. The sensor, according to claim 4, wherein:

the differential pressure sensor further comprises:

an electronic processing and control system designed for acquiring and processing the signal generated by the magnetic sensor and for generating, as a function of the signal generated by the magnetic sensor, an output signal representing a pressure difference between the first and the second chamber, wherein the positioning system comprises a first supporting element on a first face of which is rigidly mounted the magnetic sensor and a second supporting element distinct and separate axially from the first supporting element, the first and second supporting element each being an electronic card comprising printed circuits and/or electronic components forming part of the electronic system, and wherein the first and second supporting element are snap fitted. in the absence of elastic deformations of the positioning system, on the positioning element at two relative axial opposite ends.

10. A method for assembling the differential pressure sensor, according to claim 9, comprising the steps of:

axially inserting the first supporting element with a snap fit in the positioning element, axially inserting the second supporting element with a snap fit in the positioning element and lastly axially inserting the positioning system in the second cavity up to the stroke end.

11. The sensor, according to claim 4, wherein:

the positioning element further comprises:

a first reference surface facing towards the separation wall and in contact, when the positioning system is at the stroke end, with a respective stop element formed in the second cavity of the containment body and a second reference surface having a perimetral and axial extension and facing towards an inner surface of the second cavity, wherein the containment body comprises a respective main body and a shell coupled with the main body in such a way as to close the second cavity, wherein the perimetral edge of the axial end of the shell facing towards the separation wall is in contact with a third reference surface of the positioning element, facing in the opposite direction to the first reference surface, and wherein a resin partially fills the space inside the shell left free by the positioning system up to a level such that at least the elastically yieldable portion of the first axial end of the positioning system is left free by the resin.

12. The sensor, according to claim 1, wherein:

the axial length of the stroke of the positioning system between the point in which the magnetic sensor contacts the separation wall and the relative axial stroke end is less than, or equal to 1.5 mm.

13. The sensor, according to claim 12, wherein:

the positioning system further comprises a positioning element having a portion at the first axial end which is elastically yieldable in an axial direction and away from the separation wall.

* * * * *